(12) United States Patent
Aizawa (10) Patent No.: US 7,313,086 B2
(45) Date of Patent: Dec. 25, 2007

(54) OFDM RECEIVER, SEMICONDUCTOR INTEGRATED CIRCUIT AND OFDM METHOD FOR RECEIVING A SIGNAL

(75) Inventor: Masami Aizawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 881 days.

(21) Appl. No.: 10/773,149

(22) Filed: Feb. 9, 2004

(65) Prior Publication Data

US 2004/0218520 A1    Nov. 4, 2004

(30) Foreign Application Priority Data

Feb. 13, 2003    (JP)    ............................ P2003-035392

(51) Int. Cl.
| H04J 11/00 | (2006.01) |
| H04J 3/16 | (2006.01) |
| H04B 1/69 | (2006.01) |
| H03K 9/00 | (2006.01) |
| H04L 27/00 | (2006.01) |

(52) U.S. Cl. ...................... 370/208; 370/210; 370/466; 375/147; 375/324; 375/316

(58) Field of Classification Search ................ 370/203, 370/208, 209, 210, 466, 318; 455/13.4, 21, 455/24; 375/147, 148, 316, 324, 326
See application file for complete search history.

(56) References Cited

U.S. PATENT DOCUMENTS 7,248,559 B2 * 7/2007 Ma et al. .................... 370/208
7,251,291 B1 * 7/2007 Dubuc et al. ............... 375/296

FOREIGN PATENT DOCUMENTS

| JP | 11-252040 | 9/1999 |
| JP | 11-346205 | 12/1999 |
| JP | 3110423 | 11/2000 |
| JP | 2002-344414 | 11/2002 |

OTHER PUBLICATIONS

K. Harada, et al., ITE '98: 1998 ITE Annual Convention, pp. 31-32, "A Forward Error Correction Method for OFDM Transmission Considering Terrestrial Channel Characteristics" 1998 (with English Abstract).

* cited by examiner

Primary Examiner—Hanh Nguyen
(74) Attorney, Agent, or Firm—Oblon, Spivak, McClelland, Maier & Neustadt, P.C.

(57) ABSTRACT

An OFDM receiver includes a converter configured to generate a transform signal by Fourier transform of a received signal. A first interpolator is configured to detect a pilot signal from the transform signal, and to provide time interpolation to the pilot signal. An interference detector is configured to provide arithmetic processing to the time interpolated pilot signal, and to detect interference by comparing a result of the arithmetic processing with a threshold. A second interpolator is configured to provide frequency interference interpolation with respect to the interference detected pilot signal, and to provide frequency interpolation to the pilot signal after the interference interpolation. A demodulator is configured to perform demodulation based on the transform signal and the frequency interpolated pilot signal.

20 Claims, 13 Drawing Sheets

FIG. 2

⊘ : PILOT SIGNAL
○ : DATA CARRIER

OFDM RECEIVER, SEMICONDUCTOR INTEGRATED CIRCUIT AND OFDM METHOD FOR RECEIVING A SIGNAL

CROSS REFERENCE TO RELATED APPLICATIONS

This application is based upon and claims the benefit of priority from the prior Japanese Patent Application No. P2003-035392, filed on Feb. 13, 2003; the entire contents of which are incorporated herein by reference.

BACKGROUND OF THE INVENTION

1. Field of the Invention

The present invention relates to a digital transmission system, more particularly to an orthogonal frequency division multiplexing (OFDM) receiver, a semiconductor integrated circuit, and an OFDM method for receiving a signal, capable of detecting interference residing in a transmission line.

2. Description of the Related Art

The OFDM system is becoming a mainstream system for digital transmission systems for audio and video signals. In the OFDM system, data are allocated to a plurality of carriers which are orthogonal to one another. A transmitter performs inverse fast Fourier transform (IFFT) to a transmitting signal. A receiver demodulates a received signal by fast Fourier transform (FFT). For each carrier, an arbitrary modulation method such as quadrature amplitude modulation (QAM) transmission with synchronous detection, or differential detection can be applied. In the case of the synchronous detection, pilot signals are inserted periodically to the transmitting signal. The receiver performs amplitude equalization and phase equalization by finding errors based on the pilot signals in the receiving signal. In the case of differential detection, the receiving signal is demodulated by performing differential encoding between symbols without recovering the carriers.

However, in a transmission line, interference such as fading due to multipath, co-channel interference attributable to a carrier wave for analog television broadcasting, spurious interference in the transmission line, or the like exists. In the case of synchronous detection, the received signal cannot be accurately demodulated when there is interference with the pilot signals. For example, as the related art to detect interference of the pilot signals, the technique has been proposed to integrate, in a time direction, every used carrier for the pilot signals in the receiving signal. In other related art, the technique of detecting interference from fluctuations of the pilot signals in the time direction has been proposed.

The number of carriers used in ground wave digital broadcasting is far greater than the number of carriers used in a mobile communication device, a wireless local area network (LAN), and the like. According to the first discussed related art, a scale of the circuits required for detection of the interference is increased in proportion to an increase in the number of the used carriers. According to the second discussed related art, it is not possible to detect fluctuations in a frequency direction just by detecting the interference from the time jitter of the pilot signals. When the fluctuations in the frequency direction are not detectable, it is difficult to detect precisely the interference.

SUMMARY OF THE INVENTION

An aspect of the present invention inheres in an OFDM receiver encompassing, a converter configured to generate a transform signal by Fourier transform of a received signal, a first interpolator configured to detect a pilot signal from the transform signal, and to provide a time interpolation to the pilot signal, an interference detector configured to provide arithmetic processing to the time interpolated pilot signal, and to detect interference by comparing a result of the arithmetic processing with a threshold, a second interpolator configured to provide frequency interference interpolation with respect to the interference detected pilot signal, and to provide frequency interpolation to the pilot signal after the interference interpolation, and a demodulator configured to perform demodulation based on the transform signal and the frequency interpolated pilot signal.

Another aspect of the present invention inheres in a semiconductor integrated circuit encompassing, a converter integrated on a semiconductor chip and configured to generate a transform signal by Fourier transform of a received signal, a first interpolator integrated on the semiconductor chip and configured to detect a pilot signal from the transform signal, and to provide time interpolation to the pilot signal, an interference detector integrated on the semiconductor chip and configured to provide arithmetic processing to the time interpolated pilot signal, and to detect interference by comparing a result of the arithmetic processing with a threshold, a second interpolator integrated on the semiconductor chip and configured to provide frequency interference interpolation with respect to the interference detected pilot signal, and to provide frequency interpolation to the pilot signal after the interference interpolation, and a demodulator integrated on the semiconductor chip and configured to perform demodulation based on the transform signal and the frequency interpolated pilot signal.

Still another aspect of the present invention inheres in an OFDM method for receiving a signal encompassing, generating a transform signal by Fourier transform of a received signal, detecting a pilot signal from the transform signal, providing time interpolation to the pilot signal, providing arithmetic processing to the time interpolated pilot signal, detecting interference by comparing a result of the arithmetic processing with a threshold, providing frequency interference interpolation with respect to the interference detected pilot signal, providing frequency interpolation to the pilot signal after the interference interpolation, and performing demodulation based on the transform signal and the frequency interpolated pilot signal.

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, the words "connect" or "connected" defines a state in which first and second elements are electrically connected to each other without regard to whether or not there is a physical connection between the elements.

First Embodiment

Figure 1:
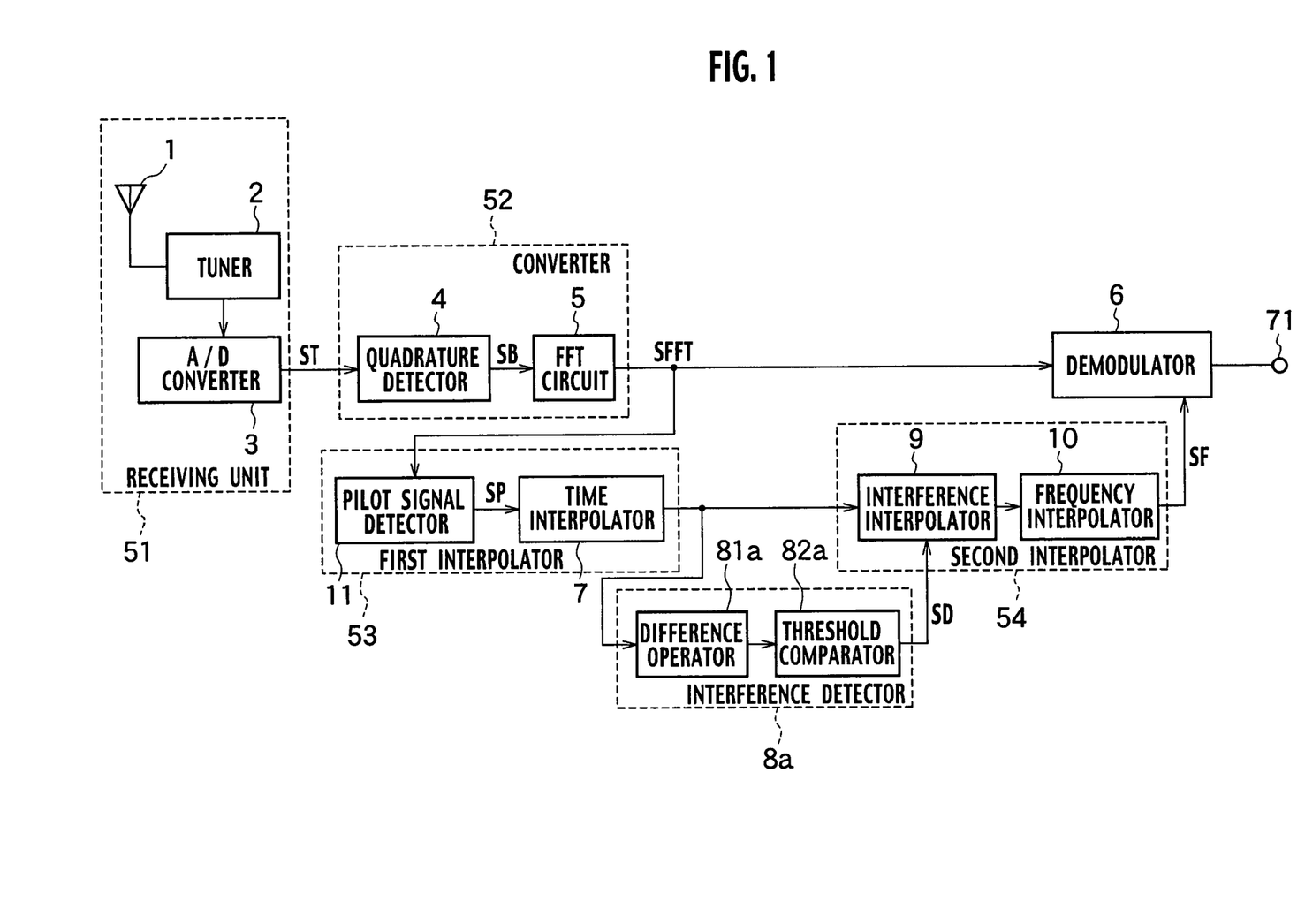
FIG. 1 is a block diagram showing an OFDM receiver according to a first embodiment of the present invention.

As shown in FIG. 1, an OFDM receiver according to a first embodiment of the present invention includes a converter 52 configured to generate a transform signal SFFT by Fourier transform of a received signal ST from a receiving unit 51, a first interpolator 53 configured to detect a pilot signal SP from the transform signal SFFT, and to provide time interpolation to the pilot signal SP, an interference detector 8a configured to provide arithmetic processing to the time interpolated pilot signal, and to detect interference by comparing a result of the arithmetic processing with a threshold, a second interpolator 54 configured to provide frequency interference interpolation with respect to the interference detected pilot signal, and to provide frequency interpolation to the pilot signal after the interference interpolation, and a demodulator 6 configured to perform demodulation based on the transform signal SFFT and the frequency interpolated pilot signal.

Furthermore, the receiving unit 51 includes an antenna 1, a tuner 2 connected to the antenna 1, and an analog to digital (A/D) converter 3 connected to the tuner 2. The converter 52 includes a quadrature detector 4 connected to the A/D converter 3, and a FFT circuit 5 connected to the quadrature detector 4. The quadrature detector 4 generates a baseband signal SB from the receiving signal ST and supplies the baseband signal SB to the FFT circuit 5. The baseband signal SB contains phase information and amplitude information on each carrier in the time direction of the receiving signal ST. The FFT circuit 5 generates the transform signal SFFT by subjecting the baseband signal SB to the fast Fourier transform. By the fast Fourier transform, the baseband signal SB is converted from a time domain to a frequency domain. The transform signal SFFT contains phase information and amplitude information on each carrier in the frequency direction of the receiving signal ST.

Figure 2:
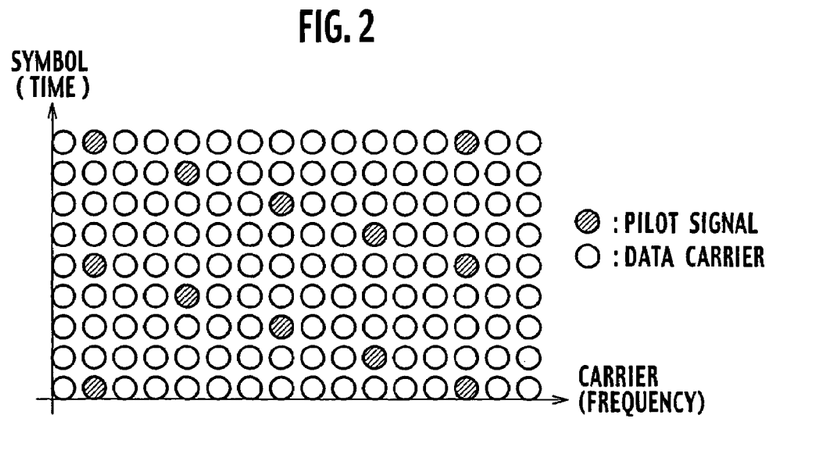
FIG. 2 is a schematic diagram showing pilot signals inserted in a receiving signal.

The first interpolator 53 includes a pilot signal detector 11 connected to the FFT circuit 5, and a time interpolator 7 connected to the pilot signal detector 11. The pilot signal detector 11 detects the pilot signals SP contained in the transform signal SFFT. As shown in FIG. 2, for example, the pilot signals SP are inserted at intervals of every four symbols of the transform signal SFFT. The time interpolator 7 interpolates a pilot signal SP in the time direction by use of previous and subsequent pilot signals SP. The pilot signal SP interpolated in the time direction is transmitted to the interference detector 8a and the second interpolator 54.

The interference detector 8a includes a difference operator 81a connected to the time interpolator 7, and a threshold comparator 82a connected to the difference operator 81a. The difference operator 81a provides difference processing to two adjacent pilot signals in the frequency direction. That is, the difference operator 81a provides difference processing to a k-th pilot signal SPk and a (k+1)-th pilot signal SP(k+1) shown in FIG. 3 (k: integer). The threshold comparator 82a compares a result of the difference processing with a threshold Ath, and generates an interference detection signal SD. Alternatively, the difference operator 81a provides the difference processing to three adjacent pilot signals in the frequency direction. That is, the difference operator 81a provides difference processing to a k-th pilot signal SPk, a (k+1)-th pilot signal SP(k+1), and a (k+2)-th pilot signal SP(k+2) shown in FIG. 4. In this case, a register for retaining difference values is included in the threshold comparator 82a.

The second interpolator 54 includes an interference interpolator 9 connected to the time interpolator 7 and the threshold comparator 82a, and a frequency interpolator 10 connected to the interference interpolator 9. The interference interpolator 9 subjects the time interpolated pilot signal SP to interference interpolation in accordance with the interference detection signal SD. As shown in FIG. 2, for example, the pilot signals SP are inserted periodically in the frequency direction of the transform signal SFFT. The frequency interpolator 10 interpolates a pilot signal SP by use of two pilot signals SP which are adjacent in the frequency direction. The frequency interpolator 10 performs the frequency interpolation frequency, and supplies a frequency interpolated signal SF to the demodulator 6. The demodulator 6 performs synchronous detection based on the transform signal SFFT and the frequency interpolated pilot signal. As a result, a transfer function for each data carrier is estimated and amplitude equalization and phase equalization are executed. A demodulation signal demodulated by the demodulator 6 is transmitted to an external circuit through an output terminal 71.

Next, an OFDM method for receiving a signal according to the first embodiment will be described with reference to FIG. 1 to FIG. 5.

(A) The received signal ST which is received by the antenna 1 shown in FIG. 1 is tuned in by the tuner 2. The A/D converter 3 converts the receiving signal ST into a digital signal. In Step S101 shown in FIG. 5, the receiving signal ST converted into the digital signal is subjected to semi-synchronous quadrature detection by the quadrature detector 4. As a result, a sine wave component and a cosine wave component, which are in a quadrature phase relation, are extracted from the receiving signal ST as the baseband signal SB. The FFT circuit 5 converts the baseband signal SB from the time domain to the frequency domain by the fast Fourier transform. Moreover, in Step S102, the pilot signal detector 11 detects the pilot signals SP from the transform signal SFFT by using the periodicity of the pilot signals SP as shown in FIG. 2. Meanwhile, in Step S103, the time interpolator 7 interpolates the pilot signals SP in the time direction.

Figure 3:
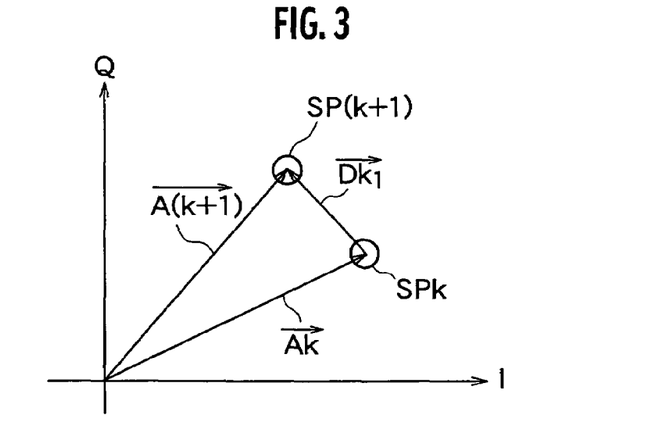
FIG. 3 is a drawing showing a principle of an interference detection of the OFDM receiver according to the first embodiment of the present invention.
Figure 4:
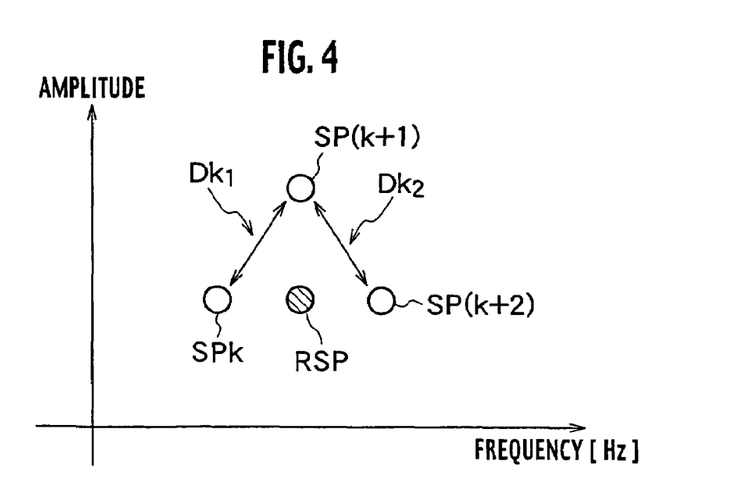
FIG. 4 is a drawing showing a principle of an interference interpolation of the OFDM receiver according to the first embodiment of the present invention.
Figure 5:
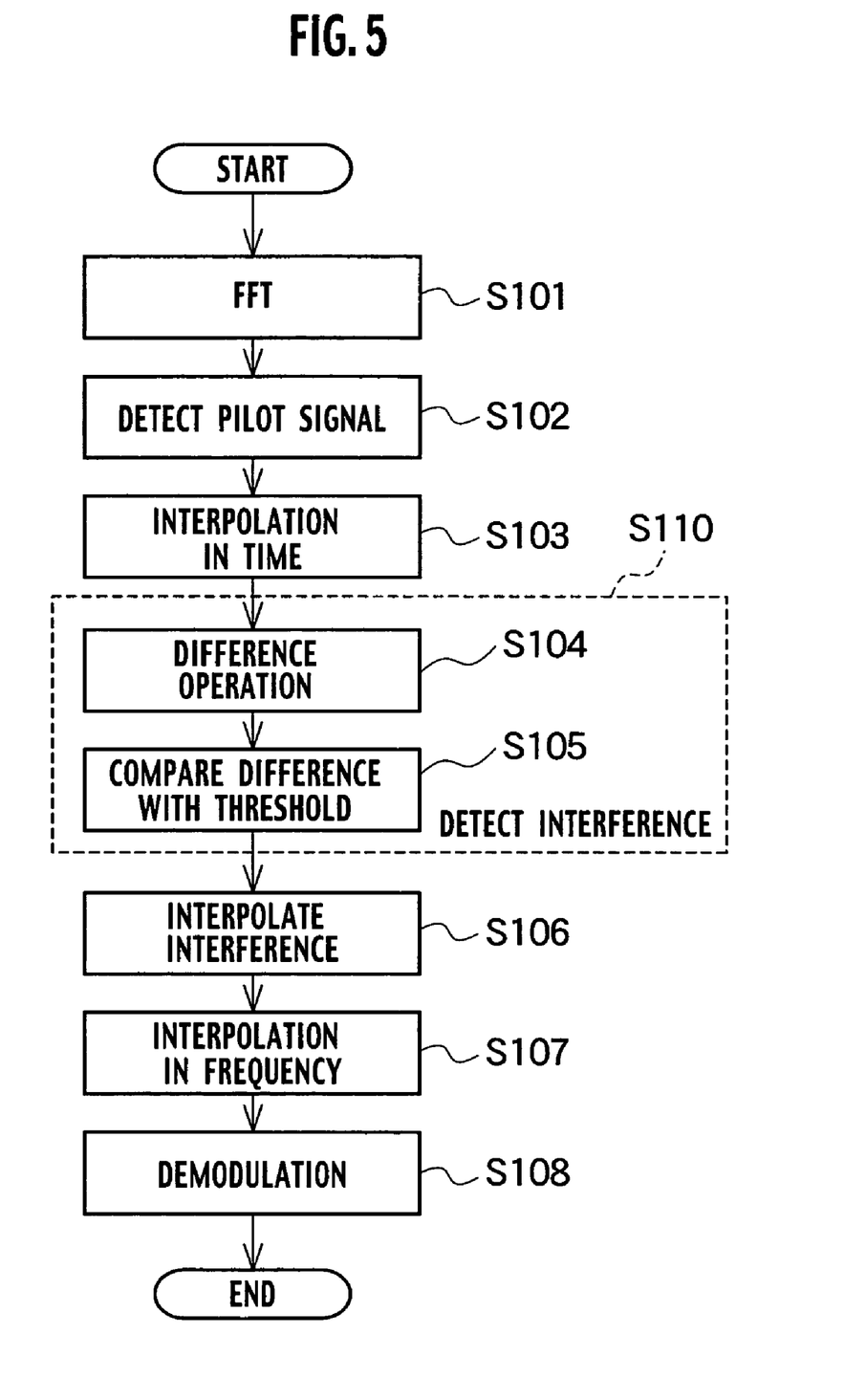
FIG. 5 is a flowchart showing an OFDM method for receiving a signal according to the first embodiment of the present invention.

(B) In Step S104, the difference operator 81a calculates a difference $Dk_1$ between a complex component of the k-th pilot signal SPk and a complex component of the (k+1)-th pilot signal SP(k+1) which are adjacent in the frequency direction as shown in FIG. 3. Alternatively, the three pilot signals adjacent in the frequency direction as shown in FIG. 4, namely, the k-th pilot signal SPk, the (k+1)-th pilot signal SP(k+1), and the (k+2)-th pilot signal SP(k+2), may be used. In this case, a first difference $Dk_1$ between the k-th pilot signal SPk and the (k+1)-th pilot signal SP(k+1), and a second difference $Dk_2$ between the (k+1)-th pilot signal SP(k+1) and the (k+2)-th pilot signal SP(k+2) which are shown in FIG. 4 are respectively calculated. When the complex component of the pilot signal SPk precedent in the frequency direction is denoted by Ak and the complex component of the pilot signal SP(k+1) subsequent in the frequency direction is denoted by A(k+1), as shown in FIG. 3, the first difference $Dk_1$ is expressed by:

$$Dk_1 = Ak - A(k+1) \quad (1)$$

Here, as shown in FIG. 4, it is also possible to apply a difference in amplitude instead of the difference in the complex component.

(C) In Step S105, the threshold comparator 82a supplies the interference detection signal SD to the interference interpolator 9 when the difference $Dk_1$ exceeds the threshold Ath. Here, the threshold Ath is preset to the value of the difference $Dk_1$ at the time of occurrence of the interference. Alternatively, the threshold comparator 82a retains the first difference $Dk_1$ and the second difference $Dk_2$. In this case, when both of the first difference $Dk_1$ and the second difference $Dk_2$ exceed the threshold Ath, the interference detection signal SD, which indicates interference of the (k+1)-th pilot signal SP(k+1) is supplied to the interference interpolator 9. Moreover, in Step S106, the interference interpolator 9 interpolates an interpolated pilot signal RSP in a mean position between the k-th pilot signal SPk and the (k+2)-th pilot signal SP(k+2) in response to the interference detection signal SD.

(D) In Step S107, the frequency interpolator 10 further provides the frequency interpolation to the pilot signal SP after the interference interpolation. The frequency interpolated pilot signal SF is supplied to the demodulator 6. Meanwhile, in Step S108, the demodulator 6 performs demodulation with synchronous detection by using the transform signal SFFT and the frequency interpolated pilot signal SF.

As described above, according to the OFDM receiver according to the first embodiment, the interference interpolator 9 can perform the interference interpolation only on the pilot signal SP for which the interference detector 8a detects the interference. Moreover, since the interference detector 9 detects the interference by detecting a fluctuation in the frequency direction, it is possible to detect the interference irrespective of fluctuation factors in the time direction. Since complicated arithmetic processing in the time direction is not required, it is not necessary to increase the circuit scale even if the number of carriers for the receiving signal ST is increased. As the frequency interpolator 10 performs the interpolation in the frequency direction with respect to the pilot signal SP subjected to the interference interpolation, it is possible to correct the interference on the pilot signal SP with high precision. Moreover, the time interpolation, the interference interpolation, and the frequency interpolation are executed prior to the demodulation. Accordingly, the pilot signal SF after the frequency interpolation can be demodulated at a substantially low error rate. Therefore, the demodulator 6 can stably perform the demodulation.

Figure 6:
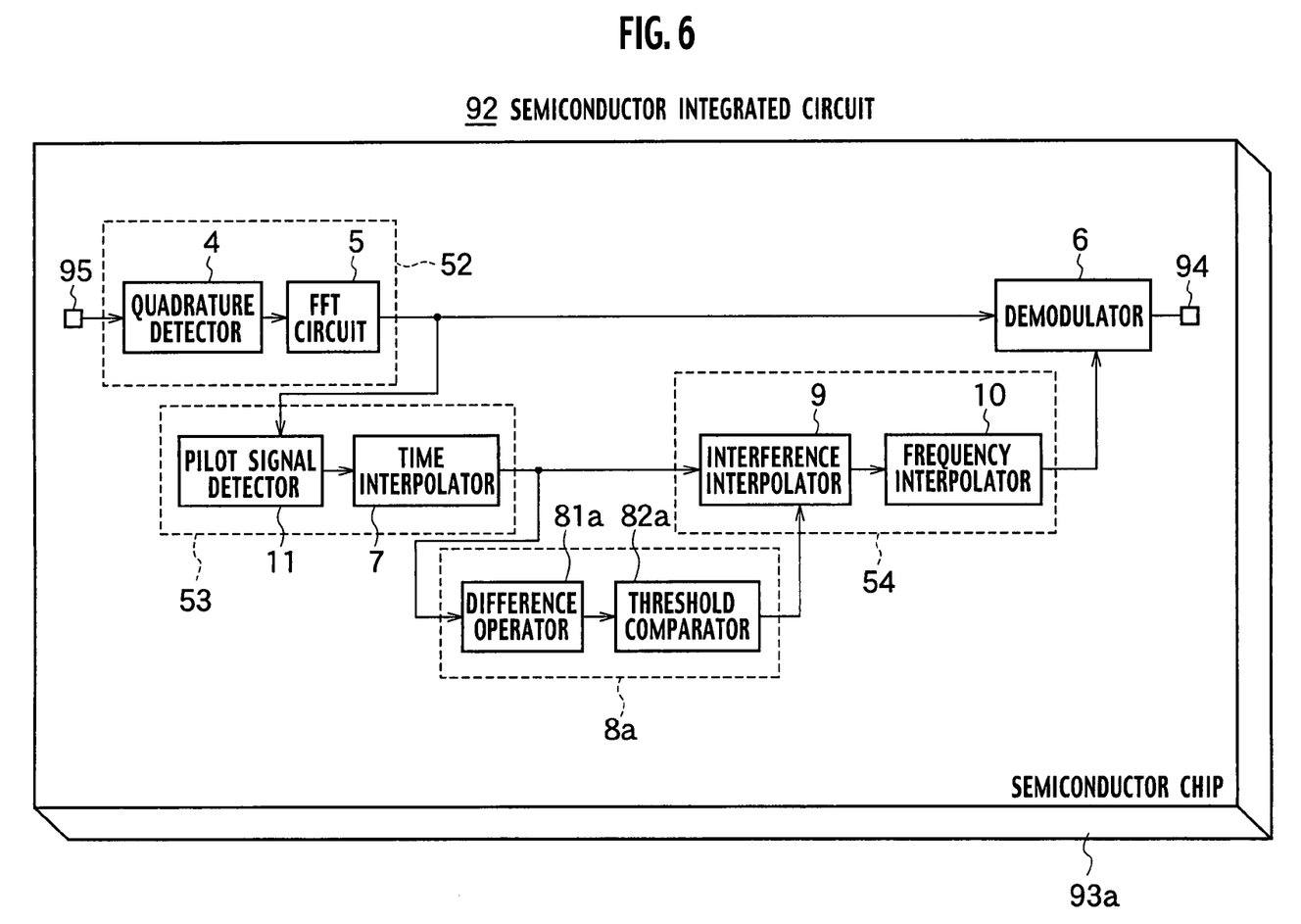
FIG. 6 is a schematic diagram showing a configuration integrated the OFDM receiver according to the first embodiment monolithically on a single semiconductor chip.

As shown in FIG. 6 for example, the OFDM receiver shown in FIG. 1 can be monolithically integrated on a single semiconductor chip 93a, and a semiconductor integrated circuit 92 can be formed. In the example shown in FIG. 6, the semiconductor integrated circuit 92 further includes bonding pads 94 and 95 on the semiconductor chip 93a. The bonding pad 95 is an internal terminal for transmitting the receiving signal ST to the quadrature detector 4. The bonding pad 94 is an internal terminal for transmitting the demodulated signal generated by the demodulator 6 to external.

Modification of First Embodiment

Figure 7:
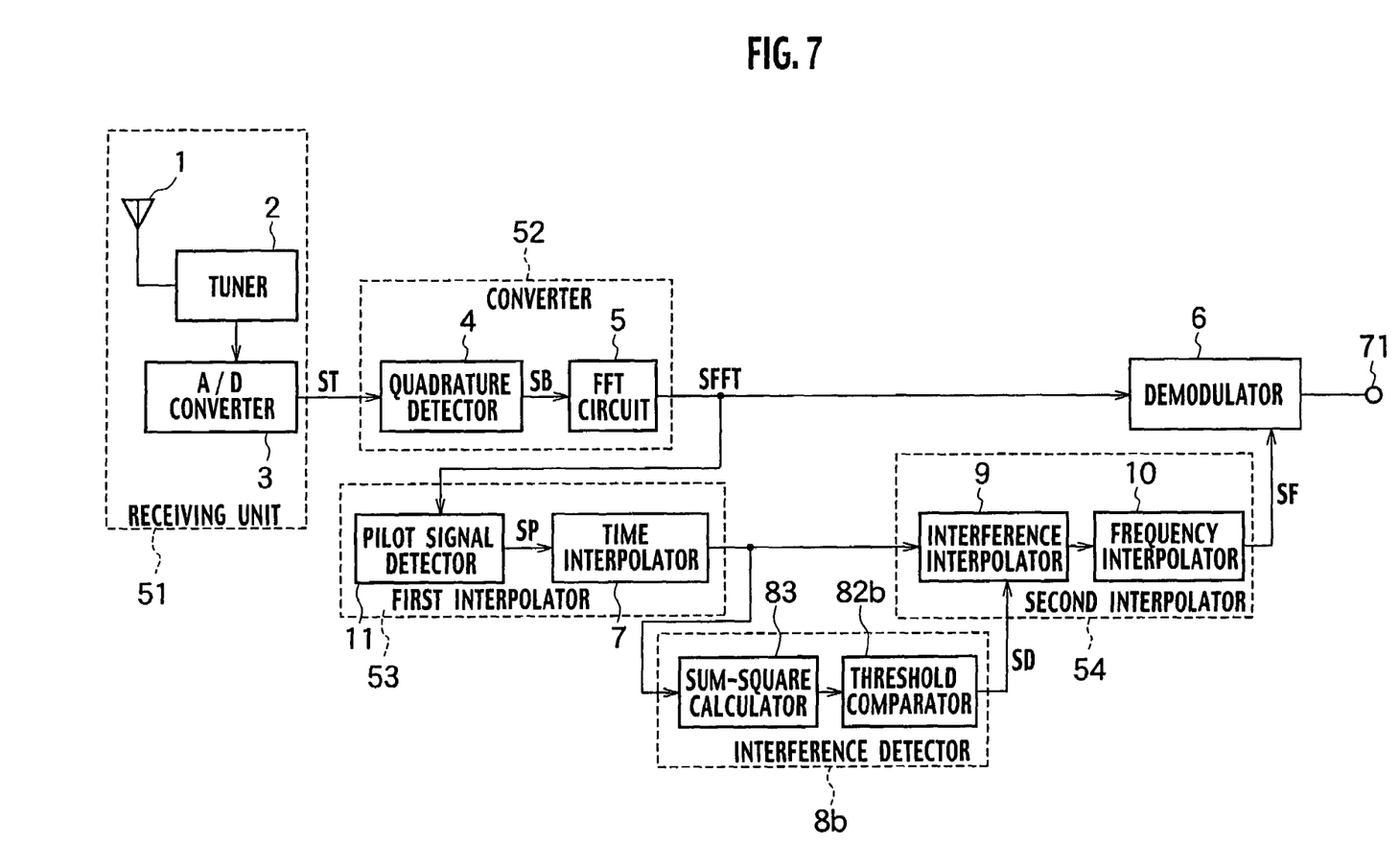
FIG. 7 is a block diagram showing an OFDM receiver according to a modification of the first embodiment of the present invention.

As a modification of the first embodiment of the present invention, as shown in FIG. 7, it is also possible to adopt a configuration in which a interference detector includes a sum-square calculator 83 configured to execute a sum-of-squares operation and thereby to obtain the amplitude of the pilot signal SP, and a threshold comparator 82b configured to compare the amplitude of the pilot signal SP with the threshold Ath. An upper limit and a lower limit are set to the threshold Ath. The threshold comparator 82b makes a judgment or determination of the interference when the amplitude of the pilot signal SP is greater than the upper limit of the threshold Ath or when the amplitude of the pilot signal SP is smaller than the lower limit of the threshold Ath. The tuner 2 normally includes an automatic gain control (AGC) circuit for holding a gain (the amplitude) of the receiving signal ST constant. Since the amplitude of the receiving signal ST becomes constant, the amplitude of the pilot signal SP is also held constant. Therefore, the interference can be detected by obtaining the amplitude of the pilot signal SP with the sum-square calculator 83 and further by comparing the amplitude value with the threshold Ath by using the threshold comparator 82b.

Second Embodiment

Figure 8:
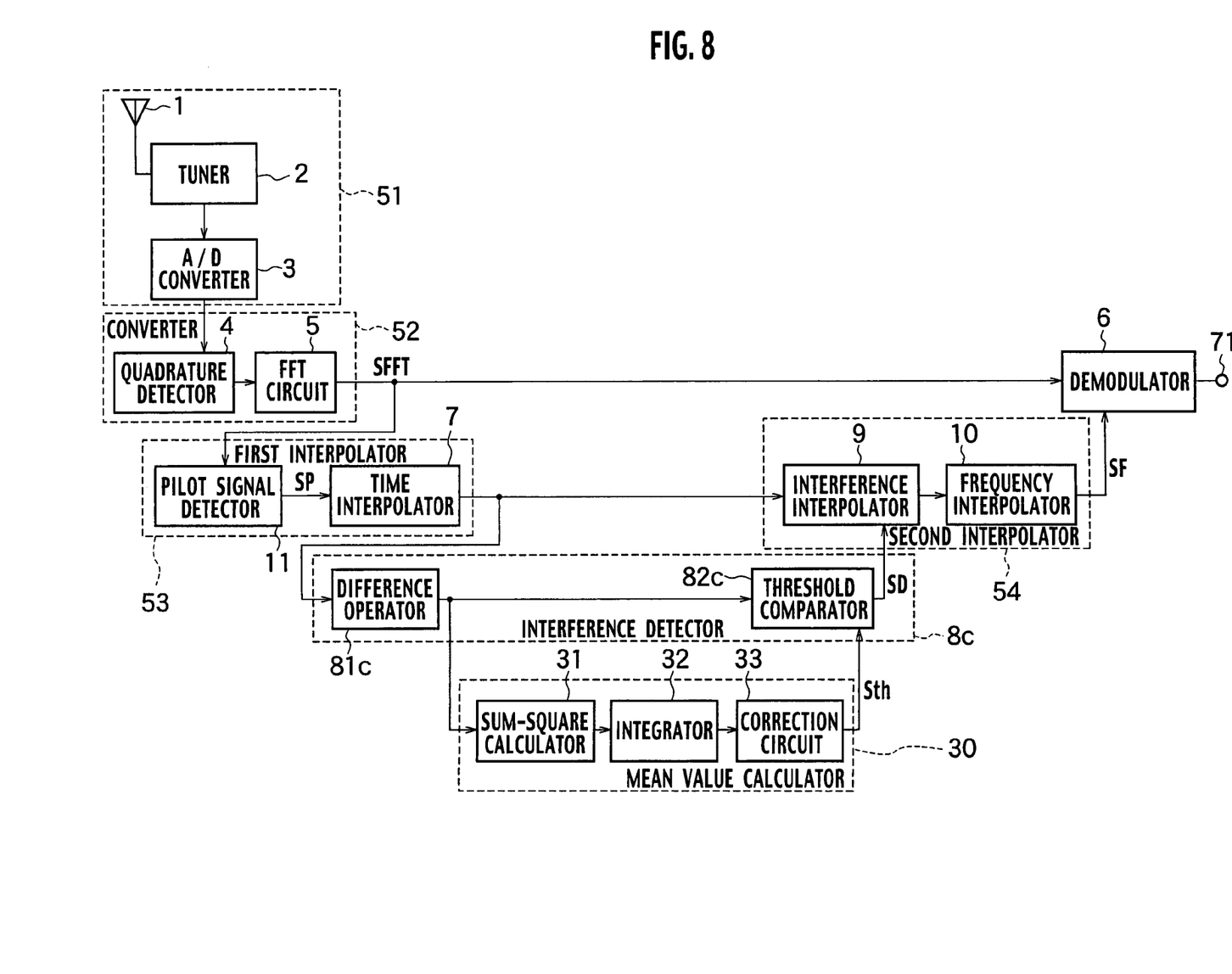
FIG. 8 is a block diagram showing an OFDM receiver according to a second embodiment of the present invention.
Figure 9:
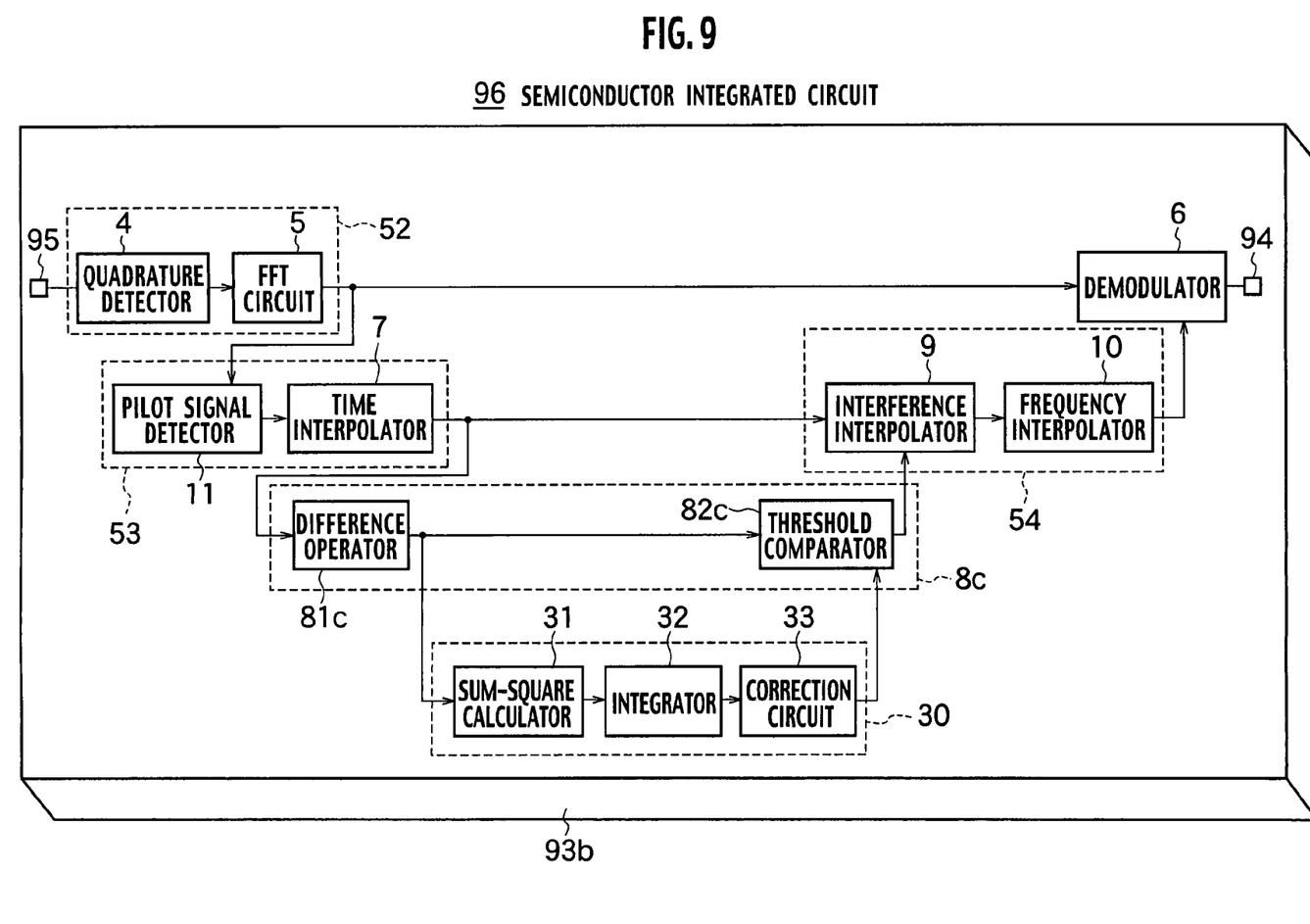
FIG. 9 is a schematic diagram showing a configuration integrated the OFDM receiver according to the second embodiment monolithically on a single semiconductor chip.

As shown in FIG. 8, an OFDM receiver according to a second embodiment of the present invention is different from the OFDM receiver shown in FIG. 1 in that the OFDM receiver of the second embodiment includes a mean value calculator 30 configured to calculate a mean value of results of differences obtained by a difference operator 81c and thereby to control a threshold Ath of a threshold comparator 82c. The mean value calculator 30 includes a sum-square calculator 31 connected to the difference operator 81c, an integrator 32 connected to the sum-square calculator 31, and a correction circuit 33 connected between the integrator 32 and the threshold comparator 82c. Other configurations are similar to the OFDM receiver shown in FIG. 1. The OFDM receiver shown in FIG. 8 can be monolithically integrated so as to form a semiconductor integrated circuit 96 on a single semiconductor chip 93b as shown in FIG. 9.

Next, an OFDM method for receiving a signal according to the second embodiment will be described by using FIG. 3, FIG. 4, FIG. 8, and FIG. 10. Repeated descriptions for the same processing according to the second embodiment which are the same as the first embodiment are omitted.

Figure 10:
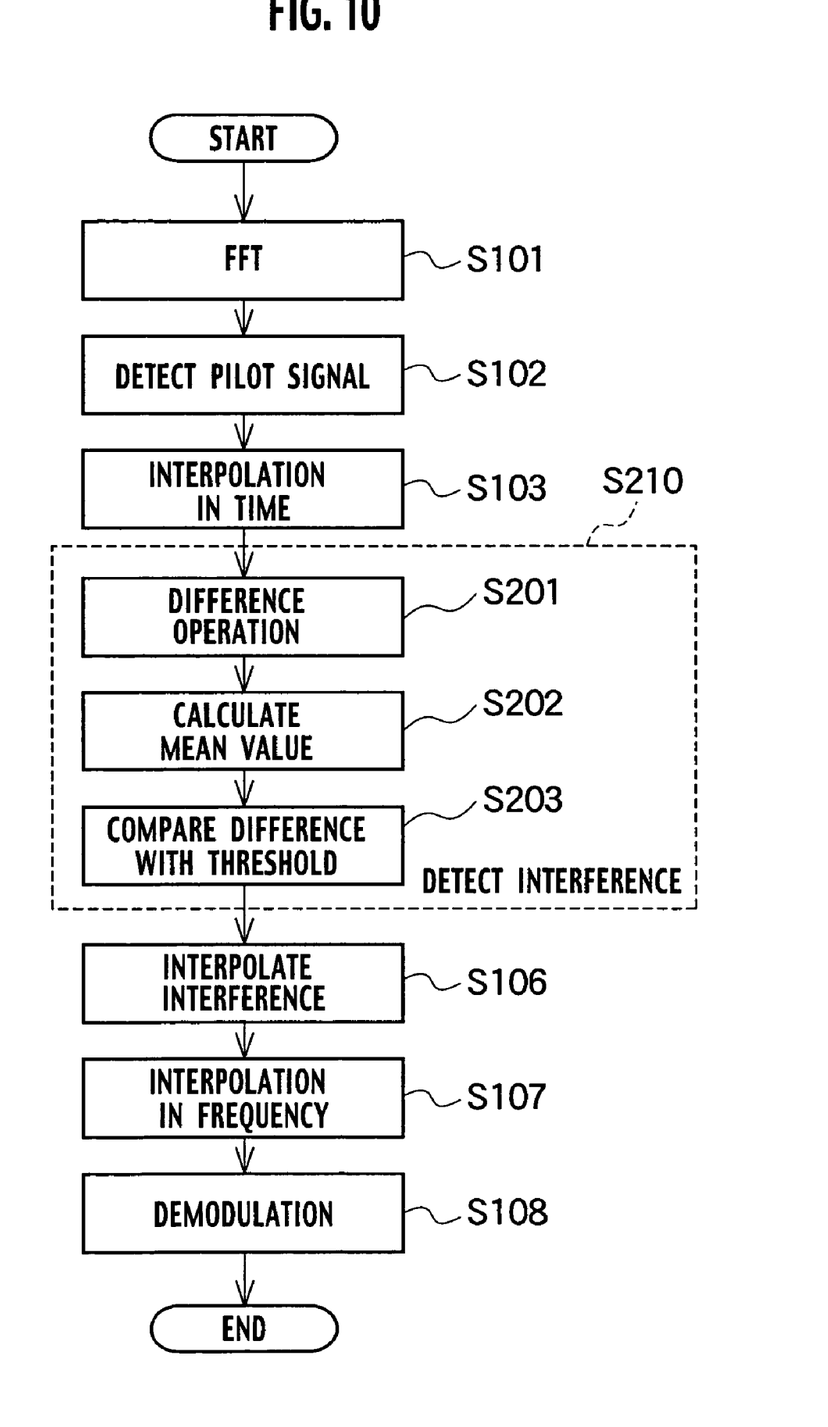
FIG. 10 is a flowchart showing an OFDM method for receiving a signal according to the second embodiment of the present invention.

(A) In Step S201 of FIG. 10, the difference operator 81c shown in FIG. 8 calculates a difference Dk between the two pilot signals adjacent in the frequency direction, namely, the complex component of the k-th pilot signal SPk and the complex component of the (k+1)-th pilot signal SP(k+1) as shown in FIG. 3 by use of the formula (1). Moreover, in Step S202, the sum-square calculator 31 provides a sum-of-squares operation to the differences Dk calculated by the difference operator 81c and thereby obtains the amplitude values of the differences Dk. The integrator 32 integrates all carriers depending on symbol units with respect to the amplitude values of the differences Dk. Alternatively, the integrator 32 integrates part of the carriers with respect to the differences Dk. A mean value of the differences Dk is obtained by such integration.

(B) In Step S203, the correction circuit 33 subjects the mean value of the differences Dk to processing including offset addition, multiplication by a constant number, and the like, and thereby calculates the threshold Ath of the threshold comparator 82c. Specifically, when "β" and "N" are integers of 2 or more and when "α" is an offset, the threshold Ath is expressed by:

$$Ath = \alpha + \beta/N \cdot \Sigma Dk \quad (2)$$

The threshold comparator 82c compares the difference Dk with the threshold Ath and thereby detects the interference.

(C) In Step S106, the interference interpolator 9 interpolates the interpolated pilot signal RSP as shown in FIG. 4 in response to the interference detection signal SD to be supplied by the threshold comparator 82c. The frequency interpolator 10 executes the frequency interpolation. The demodulator 6 demodulates the received signal by synchronous detection using the transform signal SFFT and the frequency interpolated pilot signal SF.

In this way, according to the second embodiment, the mean value calculator 30 calculates the mean value of the differences Dk. Therefore, it is possible to provide an OFDM receiver which can deal with fluctuations of the threshold Ath attributable to multipath, a frequency characteristic of the tuner, noise, and the like.

Third Embodiment

Figure 11:
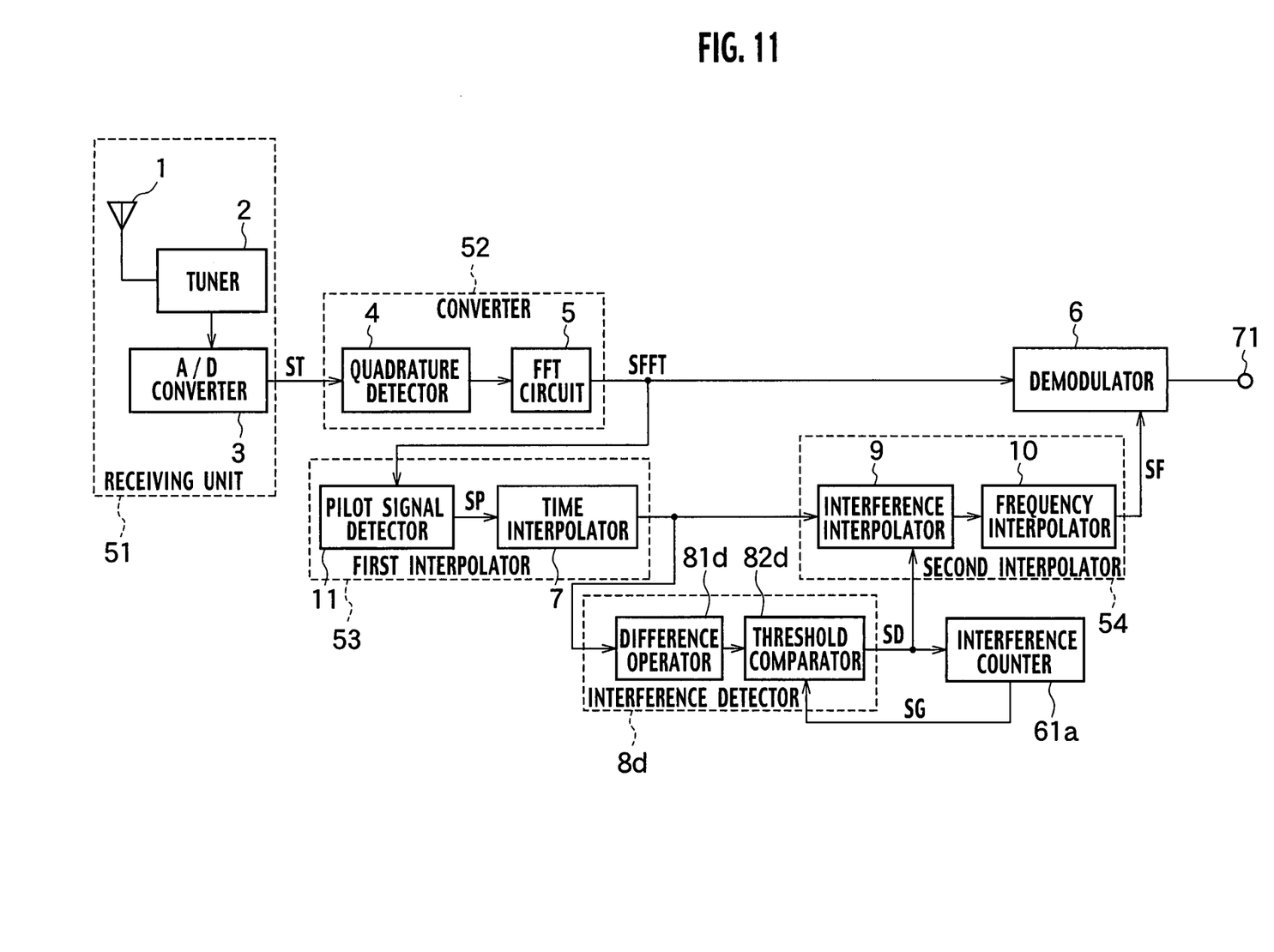
FIG. 11 is a block diagram showing an OFDM receiver according to a third embodiment of the present invention.
Figure 12:
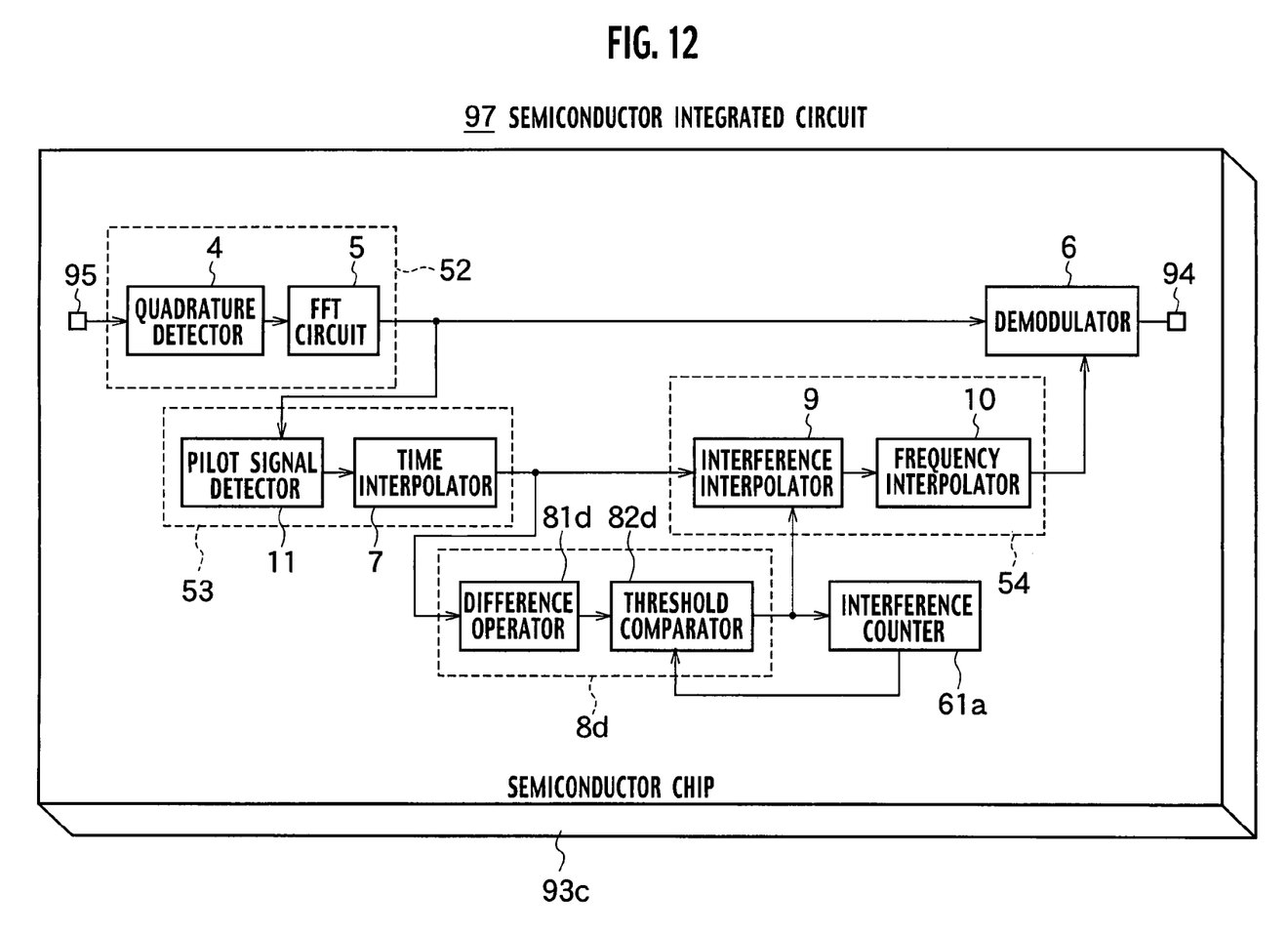
FIG. 12 is a schematic diagram showing a configuration integrated the OFDM receiver according to the third embodiment monolithically on a single semiconductor chip.

As shown in FIG. 11, an OFDM receiver according to a third embodiment of the present invention is different from the OFDM receiver shown in FIG. 1 in that the OFDM receiver of the third embodiment includes an interference counter 61a configured to count the interference detection signals SD and to modify a threshold Ath of a threshold comparator 82d in response to a count result. The interference counter 61a preferably includes a timer for generating counting time. The interference counter 61a supplies an anomaly detection signal SG to the threshold comparator 82d when the number of counts of the interference detection signals SD exceeds a predetermined number. Alternatively, the interference counter 61a supplies the anomaly detection signal SG to the threshold comparator 82d when the number of counts of the interference detection signals SD exceeds a predetermined number within a predetermined period of time. Other configurations are similar to the OFDM receiver shown in FIG. 1. The OFDM receiver shown in FIG. 11 can be monolithically integrated so as to form a semiconductor integrated circuit 97 on a single semiconductor chip 93c as shown in FIG. 12.

Next, an OFDM method for receiving a signal according to the third embodiment will be described by using FIG. 3, FIG. 4, FIG. 11, and FIG. 13. Repeated descriptions for the same processing according to the second embodiment which are the same as the first embodiment are omitted.

Figure 13:
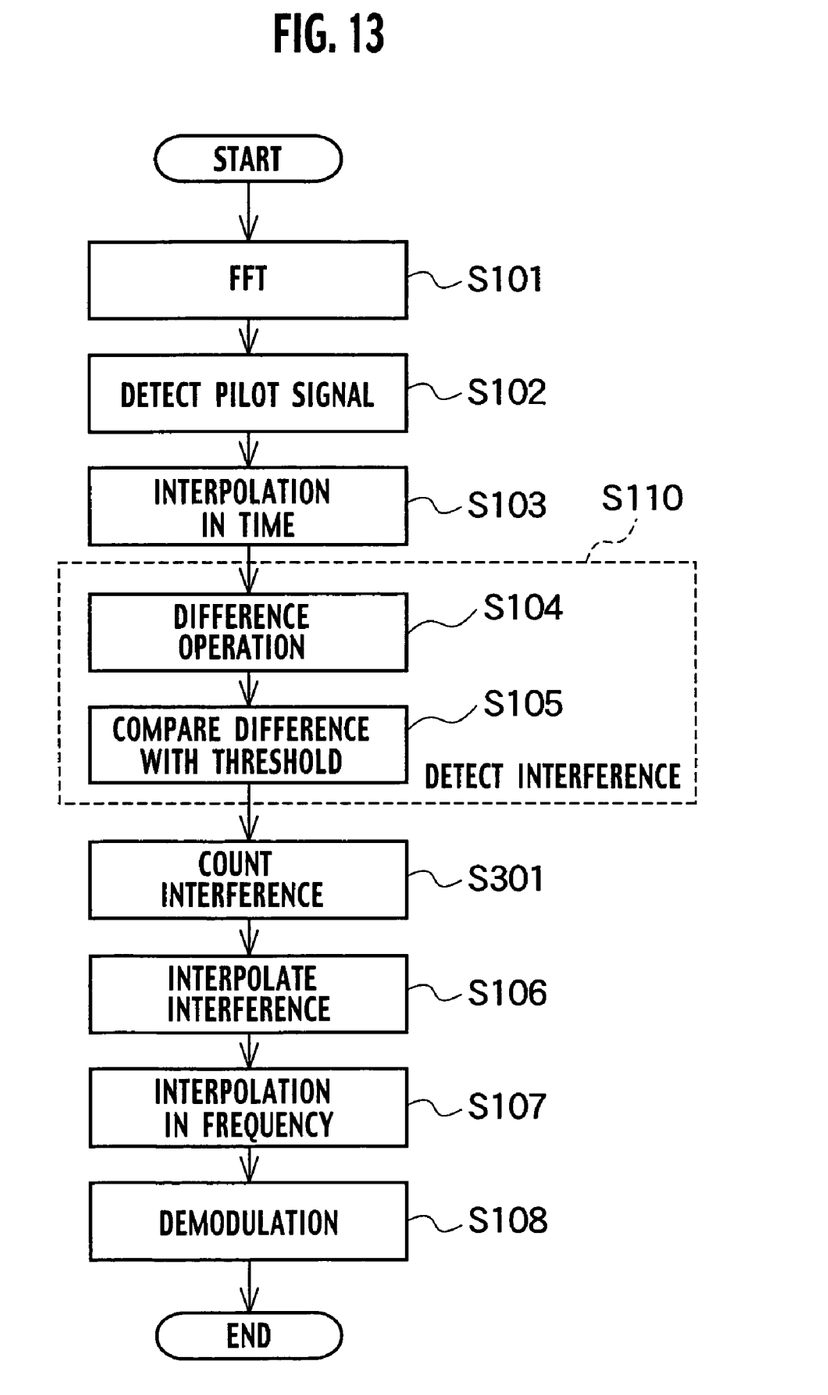
FIG. 13 is a flowchart showing an OFDM method for receiving a signal according to the third embodiment of the present invention.

(A) In Step S104 of FIG. 13, the difference operator 81d shown in FIG. 11 calculates the first difference $Dk_1$ in the amplitude between two pilot signals adjacent in the frequency direction, namely, the amplitude of the k-th pilot signal SPk and the amplitude of the (k+1)-th pilot signal SP(k+1) as shown in FIG. 4. Specifically, the first difference $Dk_1$ is obtained by:

$$|DK_1| = ||Ak| - |A(k+1)|| \quad (3)$$

Instead, the difference operator 81d may calculate the first difference $Dk_1$ between the complex component of the k-th pilot signal SPk and the complex component of the (k+1)-th pilot signal SP(k+1) as expressed in the formula (1).

(B) In Step S105, the threshold comparator 82d makes a judgment or determination of the interference when the amplitude of the pilot signal SP is greater than the upper limit of the threshold Ath or when the amplitude of the pilot signal SP is smaller than the lower limit of the threshold Ath. Accordingly, with regard to FIG. 14, the threshold comparator 82d judges or determines a fourth pilot signal SP4 as the interfered pilot signal SP. With regard to FIG. 15, the threshold comparator 82d judges or determines a fifth pilot signal SP5 as the interfered pilot signal SP. When the interference is detected from the pilot signal SP, the threshold comparator 82d supplies the interference detection signal SD to the interference interpolator 9 and the interference counter 61a.

Figure 14:
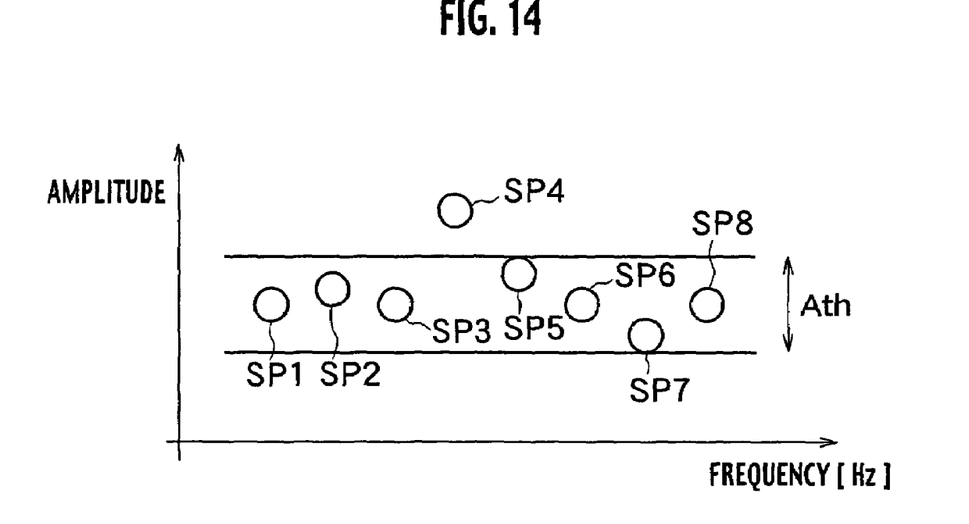
FIG. 14 is a drawing showing a principle of an interference detection of the OFDM receiver according to the first embodiment of the present invention.
Figure 15:
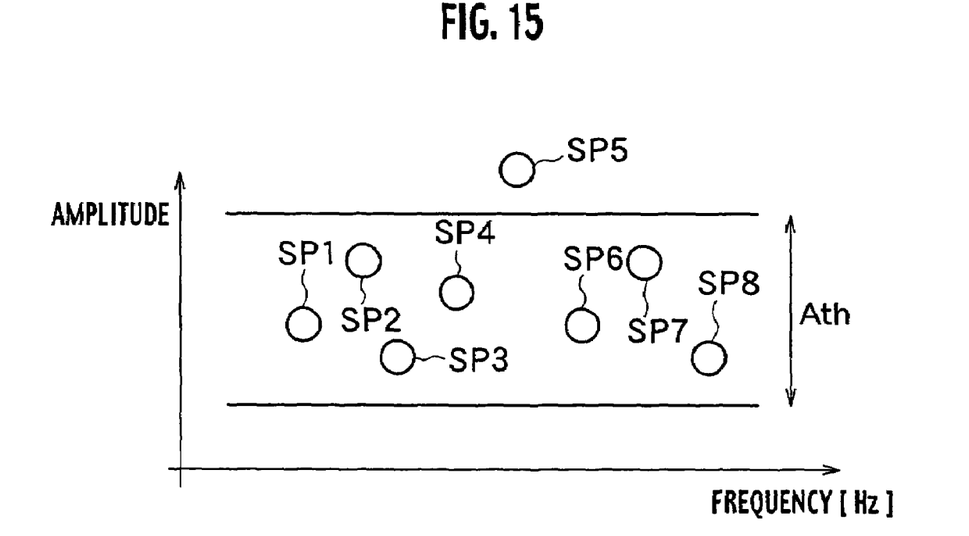
FIG. 15 is a drawing showing a principle of an interference detection of the OFDM receiver according to the first embodiment of the present invention.

(C) In Step S301, the interference counter 61a counts the interference detection signals SD up to a predetermined number, and then supplies the anomaly detection signal SG to the threshold comparator 61a. The threshold comparator 82d adjusts the value of the threshold Ath in response to the anomaly detection signal SG When pilot signals SP1 to SP8 exhibit a small range of variation as shown in FIG. 14, the threshold comparator 82d reduces the width between the upper limit and the lower limit of the threshold Ath. On the other hand, when the pilot signals SP1 to SP8 exhibit a wide range of variation as shown in FIG. 15, the threshold comparator 82d sets the threshold Ath in a wider range as compared to the case of the small range of variation among the pilot signals SP1 to SP8.

(D) In Step S106, the interference interpolator 9 performs the interference interpolates in response to the interference detection signals SD. Moreover, in Step S105 and Step S106, the demodulated signal is supplied from the output terminal 71 through the frequency interpolator 10 and the demodulator 6.

In this way, according to the third embodiment, it is possible to adjust the threshold Ath, which is set on the threshold comparator 82d, to an ideal value. Therefore, it is possible to prevent a malfunction of interpolating a pilot signal SP in which interference does not occur.

Modification of Third Embodiment

Figure 16:
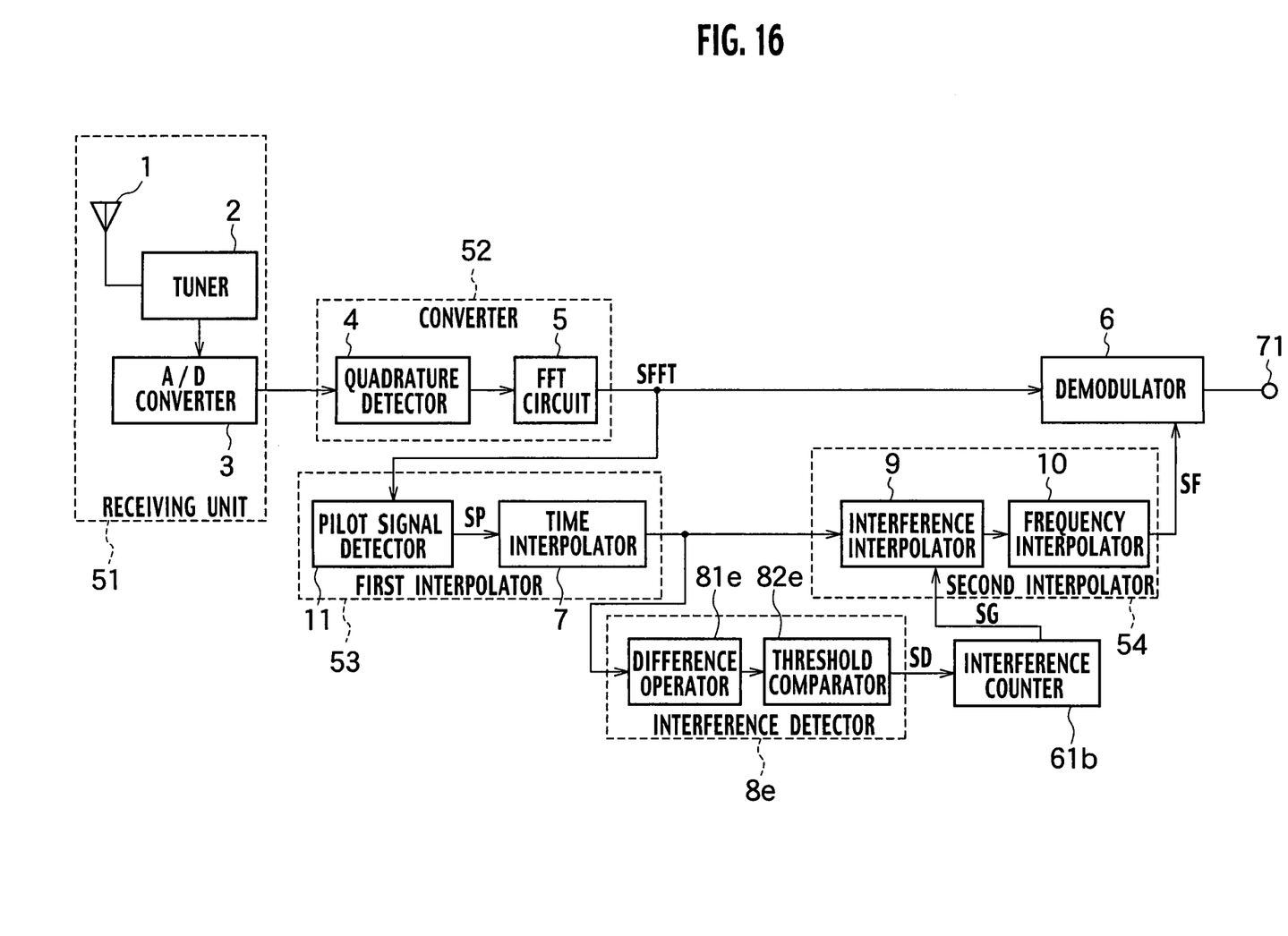
FIG. 16 is a block diagram showing an OFDM receiver according to a modification of the third embodiment of the present invention.

As an OFDM receiver according to a modification of the third embodiment of the present invention, it is also possible to adopt a configuration including an interference counter 61b configured to count the interference detection signals SD and to stop the interference interpolation by the second interpolator 54 in response to a count result as shown in FIG. 16. When interference influence is extremely large and a threshold Ath of a threshold comparator 82e is unsettled, it is possible to prevent occurrence of a malfunction by stopping the operation of the interference interpolator 9.

Other Embodiments

Various modifications will become possible for those skilled in the art after receiving the teachings of the present disclosure without departing from the scope thereof.

In the first embodiment described above, the interference interpolator 9 shown in FIG. 1 has been described to interpolate the interpolated pilot signal RSP in the mean position between the k-th pilot signal SPk and the (k+2)-th pilot signal SP(k+2) in response to the interference detection signal SD, as shown in FIG. 4. However, instead of interpolating the interpolated pilot signal RSP in the mean position, the interference interpolator 9 may interpolate the interpolated pilot signal RSP by using the periodicity of the pilot signals SP in the time direction. It is possible to perform the interference interpolation at high speed without retroactive processing by means of inserting the interpolated pilot signal RSP after a lapse of a predetermined time period from the k-th pilot signal SPk.

The second embodiment has been described on the premise that the threshold Ath was adjusted by calculating the mean value of the differences Dk as shown in FIG. 8. The third embodiment has been described on the premise that the threshold Ath was adjusted by counting the interference detection signals as shown in FIG. 11. As another embodiment of the present invention, it is also possible to adopt a configuration of connecting the interference counter shown in FIG. 11 to the threshold comparator 82c shown in FIG. 8.

Moreover, the first to third embodiments have been described without integrating the receiving unit 51 on a semiconductor substrate. However, of course, it is by all means possible to integrate part of the tuner 2 and the A/D converter 3 on the same semiconductor substrate. Such part of the tuner 2 may correspond to a mixer circuit in the tuner, a local oscillator, and the AGC circuit, for example. Furthermore, it is needless to say that the OFDM receivers according to the first to third embodiments are applicable not only to the digital terrestrial broadcasting but also to a broad range of applications including mobile telecommunication devices and the like.

What is claimed is:

1. An orthogonal frequency division multiplexing receiver comprising:
    a converter configured to generate a transform signal by Fourier transform of a received signal;
    a first interpolator configured to detect a pilot signal from the transform signal, and to provide time interpolation to the pilot signal;
    an interference detector configured to provide arithmetic processing to the time interpolated pilot signal, and to detect interference by comparing a result of the arithmetic processing with a threshold;
    a second interpolator configured to provide frequency interference interpolation with respect to the interference detected pilot signal, and to provide frequency interpolation to the pilot signal after the interference interpolation; and
    a demodulator configured to perform demodulation based on the transform signal and the frequency interpolated pilot signal.

2. The orthogonal frequency division multiplexing receiver of claim 1, wherein the converter comprises:
    a quadrature detector configured to generate a baseband signal from the received signal; and
    a fast Fourier transform circuit configured to generate the transform signal from the baseband signal.

3. The orthogonal frequency division multiplexing receiver of claim 1, wherein the first interpolator comprises:
    a pilot signal detector configured to detect the pilot signal contained in the transform signal; and
    a time interpolator configured to interpolate the pilot signal in time direction.

4. The orthogonal frequency division multiplexing receiver of claim 1, wherein the second interpolator comprises:
    an interference interpolator configured to subject the time interpolated pilot signal to the interference interpolation in the frequency direction; and
    a frequency interpolator configured to provide the frequency interpolation to the pilot signal after the interference interpolation.

5. The orthogonal frequency division multiplexing receiver of claim 1, wherein the interference detector comprises:
    a difference operator configured to calculate a difference between complex components of adjacent pilot signals in the frequency direction as the arithmetic processing; and
    a threshold comparator configured to compare the difference with the threshold.

6. The orthogonal frequency division multiplexing receiver of claim 5, further comprising a mean value calculator configured to control the threshold in accordance with the difference.

7. The orthogonal frequency division multiplexing receiver of claim 6, wherein the mean value calculator comprises:
    a sum-square calculator configured to calculate an amplitude of the pilot signal by providing a sum-of-squares operation to the difference;
    an integrator configured to calculate a mean value by integrating the amplitude; and
    a correction circuit configured to correct the mean value.

8. The orthogonal frequency division multiplexing receiver of claim 1, wherein the interference detector comprises:
    a difference operator configured to calculate a difference between amplitudes of adjacent pilot signals in the frequency direction as the arithmetic processing; and
    a threshold comparator configured to compare the difference with the threshold.

9. The orthogonal frequency division multiplexing receiver of claim 1, wherein the interference detector comprises:
a sum-square calculator configured to obtain an amplitude of the pilot signal by executing a sum-of-squares operation as the arithmetic processing; and
a threshold comparator configured to compare the amplitude with the threshold.

10. The orthogonal frequency division multiplexing receiver of claim 9, wherein the threshold comparator determines the interference when the amplitude is greater than an upper limit of the threshold or when the amplitude is smaller than a lower limit of the threshold.

11. The orthogonal frequency division multiplexing receiver of claim 1, further comprising an interference counter configured to count the interference detected pilot signal and to stop the interference interpolation in accordance with the count.

12. The orthogonal frequency division multiplexing receiver of claim 11, wherein the interference detector comprises:
a difference operator configured to calculate a difference between complex components of adjacent pilot signals in the frequency direction as the arithmetic processing; and
a threshold comparator configured to compare the difference with the threshold.

13. The orthogonal frequency division multiplexing receiver of claim 11, wherein the interference detector comprises:
a difference operator configured to calculate a difference between amplitudes of adjacent pilot signals in the frequency direction as the arithmetic processing; and
a threshold comparator configured to compare the difference with the threshold.

14. The orthogonal frequency division multiplexing receiver of claim 11, wherein the interference detector comprises:
a sum-square calculator configured to obtain an amplitude of the pilot signal by executing a sum-of-squares operation as the arithmetic processing; and
a threshold comparator configured to compare the amplitude with the threshold.

15. The orthogonal frequency division multiplexing receiver of claim 1, further comprising an interference counter configured to count the interference detected pilot signal and to modify the threshold in accordance with the count.

16. The orthogonal frequency division multiplexing receiver of claim 15, wherein the interference detector comprises:
a difference operator configured to calculate a difference between complex components of adjacent pilot signals in the frequency direction as the arithmetic processing; and
a threshold comparator configured to compare the difference with the threshold.

17. The orthogonal frequency division multiplexing receiver of claim 15, wherein the interference detector comprises:
a difference operator configured to calculate a difference between amplitudes of adjacent pilot signals in the frequency direction as the arithmetic processing; and
a threshold comparator configured to compare the difference with the threshold.

18. The orthogonal frequency division multiplexing receiver of claim 15, wherein the interference detector comprises:
a sum-square calculator configured to obtain an amplitude of the pilot signal by executing a sum-of-squares operation as the arithmetic processing; and
a threshold comparator configured to compare the amplitude with the threshold.

19. A semiconductor integrated circuit comprising:
a converter integrated on a semiconductor chip and configured to generate a transform signal by Fourier transform of a received signal;
a first interpolator integrated on the semiconductor chip and configured to detect a pilot signal from the transform signal, and to provide time interpolation to the pilot signal;
an interference detector integrated on the semiconductor chip and configured to provide arithmetic processing to the time interpolated pilot signal, and to detect interference by comparing a result of the arithmetic processing with a threshold;
a second interpolator integrated on the semiconductor chip and configured to provide frequency interference interpolation with respect to the interference detected pilot signal, and to provide frequency interpolation to the pilot signal after the interference interpolation; and
a demodulator integrated on the semiconductor chip and configured to perform demodulation based on the transform signal and the frequency interpolated pilot signal.

20. An orthogonal frequency division multiplexing method for receiving a signal comprising:
generating a transform signal by Fourier transform of a received signal;
detecting a pilot signal from the transform signal;
providing time interpolation to the pilot signal;
providing arithmetic processing to the time interpolated pilot signal;
detecting interference by comparing a result of the arithmetic processing with a threshold;
providing frequency interference interpolation with respect to the interference detected pilot signal;
providing frequency interpolation to the pilot signal after the interference interpolation; and
performing demodulation based on the transform signal and the frequency interpolated pilot signal.

* * * * *